United States Patent [19]

Wheeler

[11] 4,044,993
[45] Aug. 30, 1977

[54] HIGH VACUUM GATE VALVE

[75] Inventor: William R. Wheeler, Saratoga, Calif.

[73] Assignee: Varian Associates, Inc., Palo Alto, Calif.

[21] Appl. No.: 652,038

[22] Filed: Jan. 26, 1976

Related U.S. Application Data

[62] Division of Ser. No. 452,110, March 18, 1974, Pat. No. 3,973,753.

[51] Int. Cl.² .................... F16K 25/00; F16K 51/02
[52] U.S. Cl. .................................. 251/158; 251/334; 251/368
[58] Field of Search .................. 251/334, 368, 158

[56] References Cited

U.S. PATENT DOCUMENTS

| 1,847,385 | 3/1932 | Dengler | 251/334 X |
| 3,108,780 | 10/1963 | Wishart | 251/334 |
| 3,489,171 | 1/1970 | Michael, Jr. et al. | 251/368 X |
| 3,554,486 | 1/1971 | Thebado | 251/334 X |
| 3,945,390 | 3/1976 | Huber | 251/334 X |

FOREIGN PATENT DOCUMENTS 120,618  1/1931  Austria ............................ 251/334

Primary Examiner—Arnold Rosenthal
Attorney, Agent, or Firm—Stanley Z. Cole; Leon F. Herbert

[57] ABSTRACT

Gate valve having a closure member mounted on a swinging arm pivotally mounted for movement transversely of the axis of the valve openings. A wedge member carried by the arm drives the closure member in a direction parallel to the axis of the openings when moved longitudinally of the arm. An actuator pivots a cam which bears against the wedge member to swing the arm to a predetermined position in which the closure member is aligned with the openings and thereafter to move the cam to drive the closure member axially and seal one of the openings. Resilient members urge the closure member toward its retracted position and prevent the wedge member from moving forward until the arm reaches the predetermined position.

11 Claims, 7 Drawing Figures

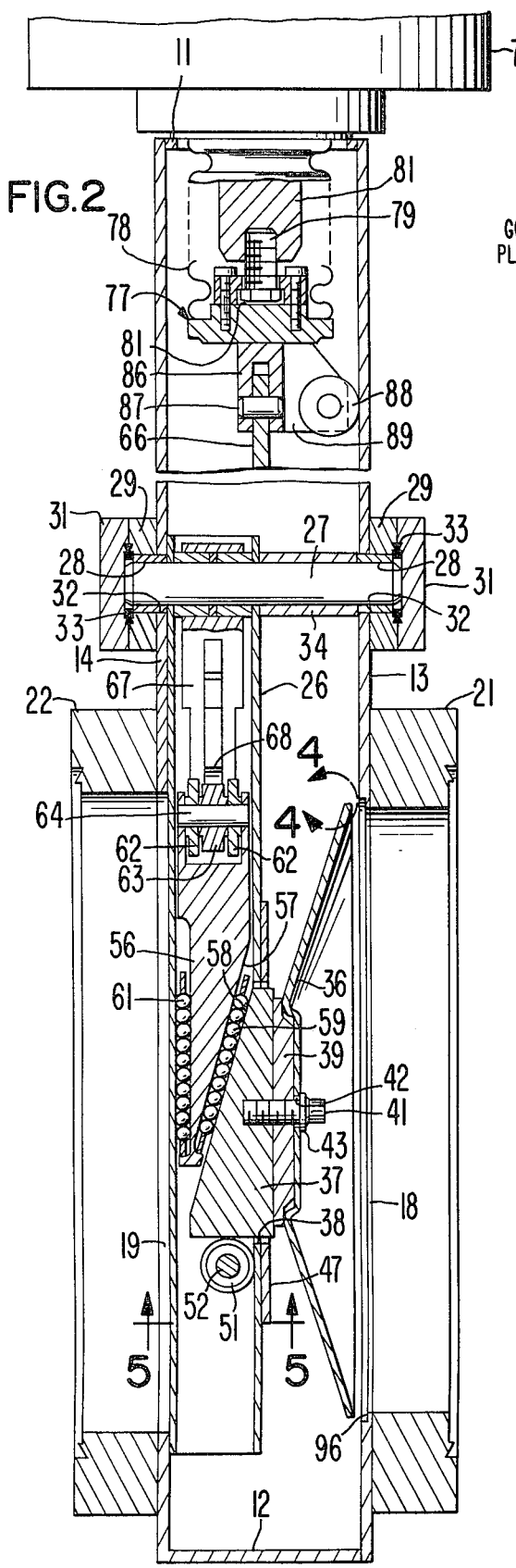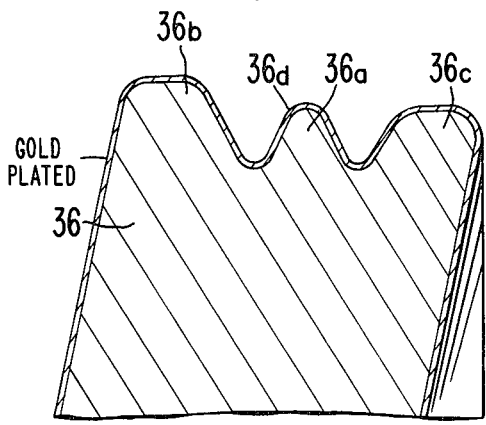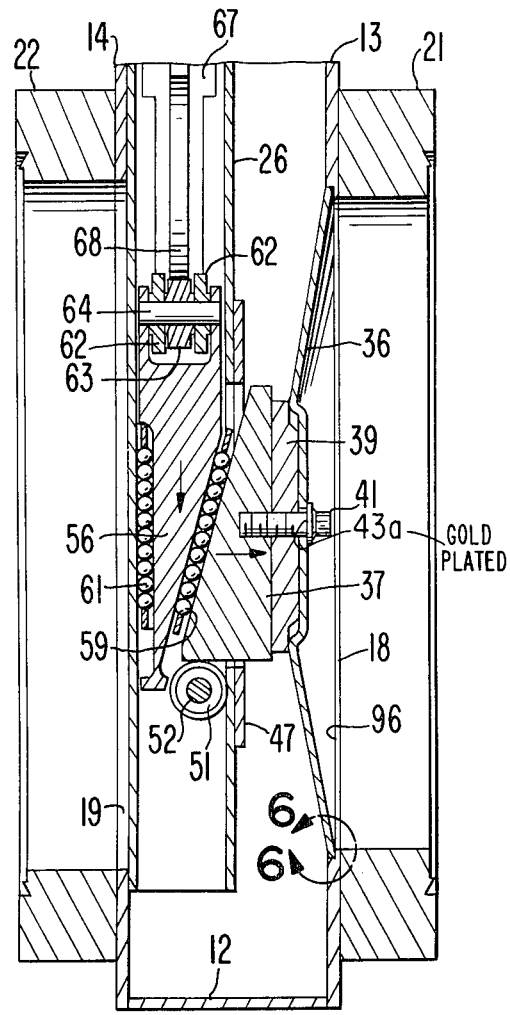

HIGH VACUUM GATE VALVE

This is a division of application Ser. No. 452,110 filed Mar. 18, 1974 now U.S. Pat. No. 3,973,753.

BACKGROUND OF THE INVENTION

This invention pertains generally to valves and more particularly to valves for use in ultra high vacuum systems, e.g. vacuum pressures on the order of $10^{-9}$ torr.

Valves heretofore provided for use in vacuum systems have included right angle valves and gate valves. In right angle valves the inlet and outlet are disposed normally of each other, and closure of the valve is commonly effected by pressing a seal into a seat by means of a screw. The force exerted by the screw generally assures an effective seal, but valves of this type are relatively slow in operation. Moreover, they are usually larger than gate valves of equivalent line size, and they are awkward in use in in-line systems.

Gate valves are well suited for use in in-line systems, and they have the additional advantage that rigid objects can be passed through them if desired.

Gate valves heretofore provided for high vacuum systems have been subject to certain disadvantages, however. The majority of these valves have utilized elastomeric seals which cannot withstand the high temperatures, e.g. 250° C, to which vacuum systems are commonly heated in a bake out process to remove gas and facilitate the reduction of pressure. An all metal valve is better suited for the bake out process, but metal seals require substantially more force to provide a fluid tight seal than elastomeric seals, and gate valves of the prior art have not been able to withstand the necessary force. Moreover, in many prior art gate valves the valve member slides into alignment with the valve openings, and the actuator must travel a distance greater than the diameter of the openings to operate the valve.

SUMMARY AND OBJECTS OF THE INVENTION

In the gate valve of the invention, the valve closure member is mounted on a swinging arm pivotally mounted for movement transversely of the axis of the valve openings. A wedge member carried by the arm drives the closure member in a direction parallel to the axis of the openings when moved longitudinally of the arm. An actuator pivots a cam which bears against the wedge member to swing the arm to a predetermined position in which the closure member is aligned with the openings and thereafter to move the cam to drive the closure member axially and seal one of the openings. Resilient members urge the closure member toward its retracted position and prevent the wedge member from moving forward until the arm reaches the predetermined position.

In one embodiment, the closure member is a conical disc which flexes axially and expands circumferentially as it is driven into engagement with a valve seal which surrounds the opening. A peripheral sealing ridge on the disc is plated with gold and protected by additional ridges adjacent thereto.

In another embodiment, the closure member is provided with an axially facing annular sealing ring which engages the valve body to form a face seal around the opening when the closure member is driven axially.

Needle bearings and rollers permit the wedge member to move substantially without friction. The closure member is mounted on the swinging arm by a screw passing through an oversized hole, and the closure member can be accurately aligned with the openings when the valve is assembled. The underside of the screw head is provided with a gold plated lip which engages the closure member to form a fluid tight seal around the opening when the screw is tightened.

It is in general an object of the invention to provide a new and improved gate valve for use in ultra high vacuum systems.

Another object of the invention is to provide a valve of the above character which can be opened or closed with a single stroke of an actuator.

Another object of the invention is to provide a valve of the above character which utilizes a wedging action to drive a valve closure member into sealing engagement with a valve seat.

Another object of the invention is to provide a valve of the above character in which the closure member is carried by a swinging arm for movement into and out of alignment with the valve openings.

Another object of the invention is to provide a valve of the above character which is compact in size and relatively inexpensive to manufacture.

Additional objects and features of the invention will be apparent from the following description in which the preferred embodiments are set forth in detail in conjunction with the accompanying drawings.

BRIEF DESCRIPTION OF THE DRAWINGS

FIG. 2 is a transverse sectional view of the valve shown in FIG. 1, illustrating the valve closure member aligned with the valve openings and in its retracted position.

FIG. 3 is a fragmentary sectional view, similar to a portion of FIG. 2, illustrating the valve closure member in its extended or sealing position.

FIG. 4 is an enlarged fragmentary view of the region 4—4 of FIG. 2, illustrating the peripheral sealing edge of the closure member.

DESCRIPTION OF THE PREFERRED EMBODIMENTS

Figure 1:
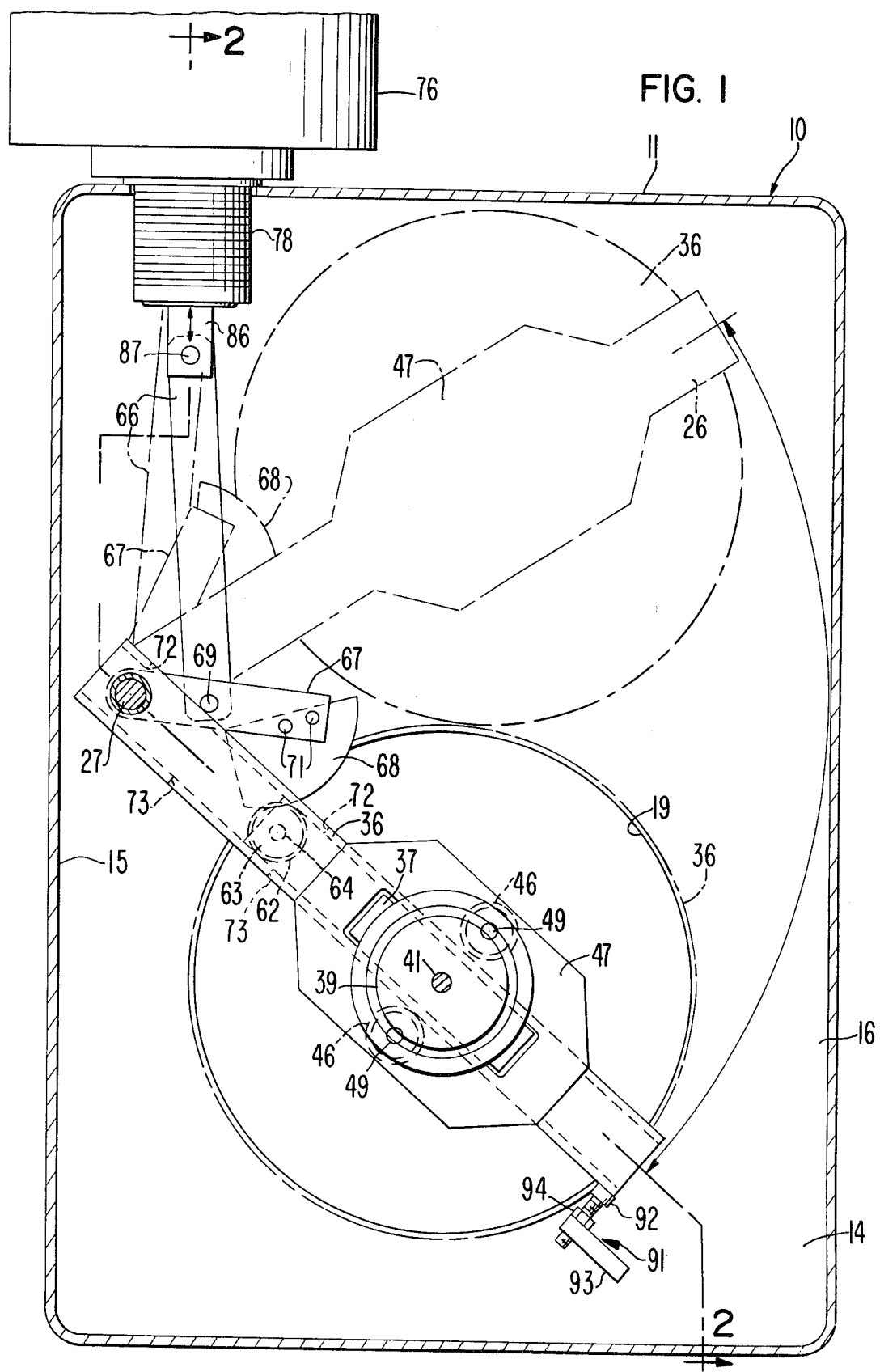
FIG. 1 is a vertical sectional view of one embodiment of a gate valve according to the invention.
Figure 5:
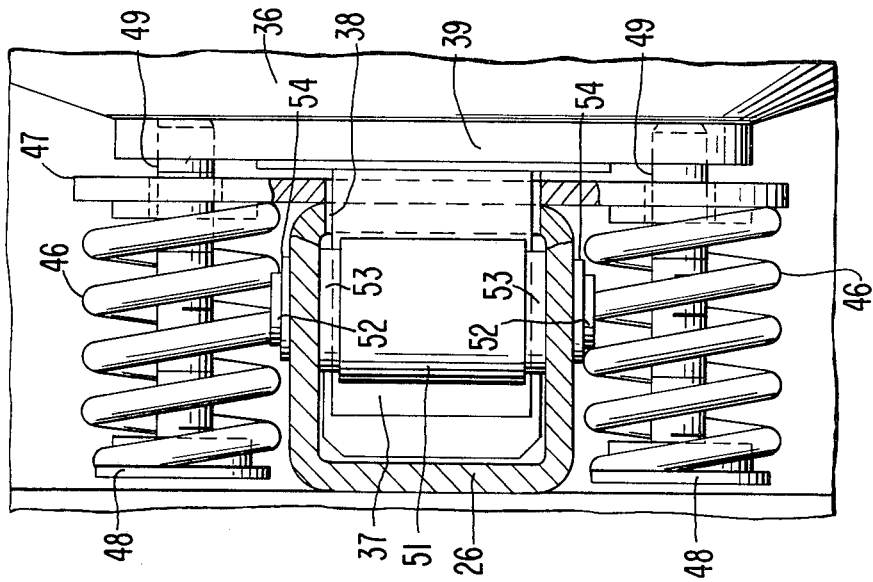
FIG. 5 is a cross sectional view taken along line 5—5 in FIG. 2.

The valve comprises a body having a top wall 11, a bottom wall 12, side walls 13 and 14, and end walls 15 and 16. The walls are joined together by a suitable process, such as welding, to form a hermetically sealed unitary structure. Axially aligned inlet and outlet openings 18 and 19 are formed in walls 13 and 14, respectively, and annular flanges 21 and 22 are disposed coaxially of the openings to provide means for connecting lines to the valve. The flanges are bonded to the body walls and hermetically sealed about the openings by suitable means such as welding.

A swinging arm 26 is pivotally mounted in the valve body for movement transversely of the axis of openings 18 and 19. This arm is mounted on a pivot pin 27 which is rotatively mounted in bearings 28. These bearings are mounted in bearing blocks 29 affixed to side walls 13 and 14, and in the preferred embodiment, the bearings are needle bearings. Pin 27 is retained axially by caps 31 which are secured to blocks 29 by screws, not shown. The pin and bearings extend through openings 32 in walls 13 and 14, and blocks 29 are bonded to the walls to form seals around these openings. Seal members 33 are disposed between caps 31 and blocks 29 to seal the ends of the pin.

In the preferred embodiment, swinging arm 26 is a rigid tubular member having a generally square cross section. It is maintained in a position adjacent to side wall 14 by a spacer 34 on pin 27.

A valve closure member 36 is mounted on swinging arm 26 and positioned to be moved into and out of alignment with openings 18 and 19 as the arm swings in the valve body. The closure member is also movable between extended and retracted positions in a direction generally parallel to the axis of the openings. The closure member is mounted on a wedge member 37 which passes through an opening 38 in one wall of the swinging arm and is movable laterally of the arm. A support disc 39 is provided between the closure member and the wedge member, and the closure member and support disc are secured to the wedge member by a screw 41 which passes through an opening 42 in the closure member. This opening is made larger in diameter than the body of the screw to permit the position of the closure member to be adjusted with the valve fully assembled to assure proper alignment with opening 18. The underside of the screw head is provided with an annular sealing lip 43 which engages the closure member to form a seal around opening 42 when the screw is tightened. In the preferred embodiment, lip 43 is plated with a soft metal such as gold.

Resilient means is provided for urging closure member toward its retracted position. This means comprises compression springs 46 constrained between a flat wing plate 47 affixed to arm 26 and retainer washers 48 on screws 49 carried by support disc 39.

A roller 51 engages the forward end of wedge member 37 and prevents movement of the member longitudinally of arm 26. This roller is rotatively mounted on a pin 52 which extends transversely of the arm by means of bearings 53. The pin is retained in the arm by retaining clips 54.

A second wedge member 56 is mounted in swinging arm 26 and adapted for movement longitudinally thereof. This wedge member has a generally planar inclined surface 57 which faces a similar surface 58 on wedge memer 37. Needle bearings 59 are disposed between the inclined surfaces to provide rolling movement between the wedge members. Additional needle bearings 61 provide rolling movement of wedge member 56 in arm 26. A pair of guide rollers 62 and a cam follower roller 63 are rotatively mounted on a pin 64 at the rear of wedge member 56. The guide rollers are of larger diameter than the cam follower roller, and they engage the walls of arm 26 to prevent side loading of the wedge member.

Means is provided for swinging arm 26 in the valve body and moving wedge member 56 longitudinally of the arm. This means includes an operating rod 66, a pivot link 67 and a cam member 68. One end of link 67 is pivotally mounted on pin 27, and operating rod 66 is pivotally connected to link 67 by a pin 69. Cam member 63 is rigidly affixed to pivot link 67 by pins 71 and positioned for engaging cam follower roller 63. Apertures 72 and 73 are provided in the walls of arm 26 to pass the pivot link and cam member.

An actuator 76 of a suitable type such as a manually operated rising stem screw or a double acting pneumatic cylinder is provided for operating the valve between open and closed positions. In applications where failsafe operation is desired, the actuator can include means such as springs for moving the valve in the desired direction in the event of a failure of the power which normally operates the actuator. An all metal actuator is preferably utilized with valve subject to bake out or nuclear environments.

Actuator 76 is mounted outside valve body 10 and connected to operating rod 66 by a flexible coupling 77 sealed by a bellows 78. The coupling includes a bolt 79 which is threadedly connected to the output shaft 81 of the actuator. The head of bolt 79 is loosely constrained in a socket 81 formed between a base 82 and a cap 83 secured together by screws 84. Operating rod 66 is pivotally connected to a yoke 86 on base 82 by a pin 87, and a guide roller 88 mounted on a flange 89 affixed to base 82 engages side wall 13 of the valve body.

Means is provided for limiting the movement of swinging arm 26 in one directon to define a limiting position in which closure member 36 is aligned with openings 18 and 19. This means comprises an adjustable stop mounted on side wall 14 of the valve body. The stop includes a screw 92 which is threadedly mounted in a flange 93 affixed to the wall body. A lock nut 94 mounted on the screw can be tightened against the flange to lock the screw in a desired position.

In the embodiment illustrated in FIGS. 1–6, valve closure member 36 is a conical disc adapted to be received in a valve seat 96 which is formed in side wall 13 of the valve body around opening 18. The disc is fabricated of a high temperature spring material such as beryllium copper, and it expands circumferentially when flexed in the axial direction. A sealing ridge 36a is formed in the outer peripheral edge of the disc and extends circumferentially thereof. Additional ridges 36b and 36c are formed in the edge and spaced axially from the sealing ridge. Ridge 36b is of larger diameter than the sealing ridge, and ridges 36b, 36c serve to protect the sealing ridge in the event that the disc is dropped or struck on the edge. In addition, ridge 36c serves to guide the disc into the valve seat in the event of slight misalignment.

A coating of gold 36d or other suitable soft metal is provided on sealing ridge 36a. In the preferred embodiment a relatively thick gold plating, e.g., 0.002 inch, is provided on the edge of the disc, and the remainder of the disc is provided with a thinner plating of the same material.

Figure 6:
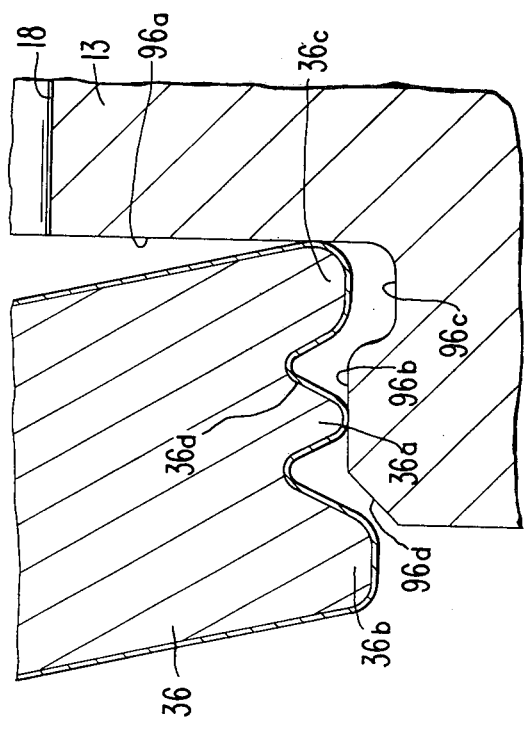
FIG. 6 is an enlarged fragmentary sectional view illustrating the mating of the closure member with a valve seat to form a seal.

As illustrated in FIG. 6, valve seat 96 has a annular bottom wall 96a and a cylindrical side wall 96b. The side wall is spaced from the bottom wall by a distance such that sealing ridge 36a is positioned to engage the side wall when the leading edge of protective ridge 36 engages the bottom wall. A recess 96c is provided between the bottom wall and the side wall to accommodate ridge 36c, and a beveled surface 96d is provided at the outer edge of the seat.

Valve opening 19 is larger than valve opening 18, and valve disc 36, swinging arm 26 and the other elements mounted within the body can be installed and removed through the larger opening.

Operation and use of the embodiment of FIGS. 1–6 can be described briefly. It is assumed that valve disc 36 and stop screw 92 have been adjusted for proper alignment of the valve disc with seat 96 and that initially the valve is in the open position indicated by dashed lines in FIG. 1. In this position, valve disc 36 is out of alignment with openings 18 and 19, and lines connected to the valve communicate freely through the openings.

When actuator 76 is actuated to close the valve, yoke 86 makes a downward stroke, pivoting cam member 68 downwardly in a clockwise direction, as viewed in FIG. 1. The cam member engages roller 63 on wedge member 56, and as long as arm 26 is free to pivot, springs 46 retain valve disc 36 in its retracted position and prevent wedge member 56 from moving in the arm. Consequently, the force applied to roller 63 by cam member 68 causes arm 26 to swing in the clockwise direction toward stop 91. When the arm abuts against stop screw 92, the force applied by the cam member overcomes the force of retaining springs 46, and wedge member 56 moves forward, driving wedge member 37 and valve disc 36 toward their extended position. When the disc contacts bottom wall 96a of valve seat 96, the disc flexes axially and expands circumferentially, forcing sealing ridge 36a outwardly against wall 96b of the seat. This force deforms the gold plating on the sealing ridge, providing a fluid tight seal between this ridge and the seat wall.

The valve is opened by an upward stroke of actuator 76 which rotates cam member 68 in the upward or counter-clockwise direction, as viewed in FIG. 1. As the cam member begins its upward rotaton, springs 46 withdraw the valve disc from the valve seat and drive wedge member 56 toward its retracted position. As the axial force on the valve disc is relaxed, the disc returns to its unflexed condition in which it can be withdrawn from the seat. When the disc and wedge members reach their retracted positions, pivot link 67 abuts against the wall of arm 26 at the rear edge of aperture 72. Thereafter, the continuing upward stroke of actuator 76 causes the arm to swing counter-clockwise to the valve open position shown in dashed lines in FIG. 1.

Figure 7:
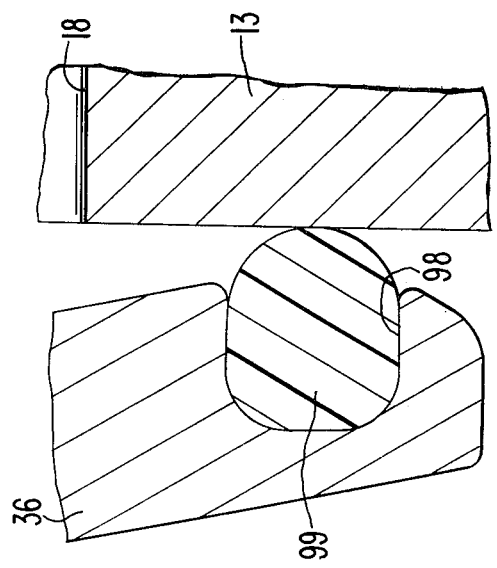
FIG. 7 is an enlarged fragmentary view illustrating the formation of a seal in another embodiment of the invention.

The embodiment of FIG. 7 is similar to the embodiment of FIGS. 1-6 except for the manner in which the seal is formed around opening 18. In the embodiment of FIG. 7, valve closure member 36 is a rigid plate having an annular groove 98 in which an O-ring 99 is mounted. The O-ring is fabricated of an elastomeric material such as Viton, and it is positioned for engaging the inner surface of wall 13 around opening 18. Valve seat 96 is not used in this embodiment and can be omitted.

Operation and use of the embodiment of FIG. 7 is generally similar to the operation and use of the first embodiment. However, in the embodiment of FIG. 7, rigid valve plate 36 does not flex appreciably when driven toward opening 18, and O-ring 99 is compressed against wall 13 to form a fluid tight face seal around the opening.

The invention has a number of important features and advantages. The valve is compact and fast acting, and it can be opened or closed with a single stroke of the actuator. The length of the stroke is short compared to the diameter of the valve opening, for example a ½ inch stroke with a 6 inch opening. The wedges and conical disc each provide a substantial mechanical advantage, and a very high scaling force is produced by a relatively small force from the actuator. Since the wedges move on rolling surfaces, frictional losses are minimized. The adjustable stop and mounting screws permit the valve member to be acurately aligned with the valve openings. Moreover, the valve is durable and relatively inexpensive to manufacture.

It is apparent from the foregoing that a new and improved gate valve for ultra high vacuum systems has been provided. While only the presently preferred embodiments have been described, as will be apparent to those familiar with the art, certain changes and modifications can be made without departing from the scope of the invention as defined by the following claims.

I claim:

1. Apparatus for valving comprising a valve member having a circular sealing surface, a sealing ridge extending outwardly from the said surface, a pair of protecting ridges extending outwardly from said surface, the sealing ridge being positioned between said protective ridges, and said sealing ridge being radially inward of a plane across said pair of protecting ridges.

2. Apparatus for valving as claimed in claim 1 wherein said valve member is in the form of a conical disc forming said sealing surface on its periphery, and further comprising a valve body forming a circular valve seat having a portion engageable by said disc when said disc is moved to closing position and said seat having another portion engageable by said sealing ridge, and means for moving said disc into engagement within said seat.

3. In a valve assembly: a valve body having inlet and outlet openings, a valve seat surrounding one of the openings and having a bottom wall and a side wall, said side wall having a generally cylindrical portion forming a sealing surface, a radially expandable valve member having a peripheral sealing ridge and a protective ridge adjacent to the sealing ridge, means for urging the valve member into the seat whereby the side of the protective ridge abuts against the bottom wall of the seat and the sealing ridge is urged into sealing abutment with said sealing surface of the side wall, and said side wall having a recess between said sealing surface and said bottom wall to accommodate radially outward movement of said protective ridge.

4. The valve assemby of claim 3 wherein the protective ridge is of substantially the same diameter as the sealing ridge when the valve member is in its unexpanded condition.

5. The valve assembly of claim 3 wherein the valve member includes a second protective ridge disposed on the opposite side of the sealing ridge from the first named protective ridge.

6. The valve assembly of claim 3 wherein a layer of gold is provided on the sealing ridge.

7. In valving apparatus: a non-planar one-piece disclike valve member adapted for expansion in a radial direction when flexed in an axial direction, a radially extending sealing ridge at the periphery of the valve member, and a protective ridge axially adjacent to the sealing ridge at the periphery of the member.

8. The apparatus of claim 7 further including a second protective ridge adjacent to the sealing ridge, the sealing ridge being positioned between the protective ridges.

9. The apparatus of claim 7 wherein the protective ridge is of greater diameter than the sealing ridge.

10. The apparatus of claim 7 wherein a layer of soft metal is provided on the sealing ridge.

11. In an apparatus for forming a releasable seal, first sealing means forming a circular sealing wall and an annular abutment wall, second sealing means adapted for engagement with said first sealing means, said second sealing means having at least a partially conical shape adapted for flexing when compressed axially, said second sealing means having a sealing rim with a compression surface adapted to engage said abutment wall and a circular sealing ridge adapted to engage said circular sealing wall, said sealing rim having a circular recess between said compression surface and said sealing ridge, a protective ridge on said sealing rim and located on the side of said sealing ridge opposite from said recess, means for releasably forcing said first and second sealing means together; and said protective ridge being arranged so that when said compression surface and sealing ridge engage their respective portions of said first sealing means, said protective ridge is spaced from said first sealing means.

* * * * *

UNITED STATES PATENT AND TRADEMARK OFFICE
CERTIFICATE OF CORRECTION

PATENT NO. : 4,044,993

DATED : August 30, 1977

INVENTOR(S) : William R. Wheeler

It is certified that error appears in the above—identified patent and that said Letters Patent are hereby corrected as shown below:

```
Column 1, line 19, change "in" first occurrence to --to--;
Column 3, line 51, change "memer" to --member--;
Column 3, line 67, change "63" to --68--;
Column 4, line 54, change "a" to --an--;
Column 5, line 30, change "rotaton" to --rotation--;
Column 5, line 61, change "1/2" to --1-1/2--;
Column 5, line 64, change "scaling" to --sealing--.
```

Signed and Sealed this

Sixteenth Day of February 1982

[SEAL]

Attest:

Attesting Officer

GERALD J. MOSSINGHOFF

Commissioner of Patents and Trademarks